(12) United States Patent
VanBlon et al.

(10) Patent No.: US 10,158,728 B1
(45) Date of Patent: Dec. 18, 2018

(54) METHOD AND DEVICE TO TRACK OBJECTS

(71) Applicant: Lenovo (Singapore) Pte. Ltd., New Tech Park (SG)

(72) Inventors: Russell Speight VanBlon, Raleigh, NC (US); John Weldon Nicholson, Cary, NC (US); Ming Qian, Cary, NC (US); Song Wang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/690,782

(22) Filed: Aug. 30, 2017

(51) Int. Cl.
*H04W 4/029* (2018.01)
*H04L 29/08* (2006.01)
*H04W 4/02* (2018.01)
*G06F 3/01* (2006.01)
*G06F 3/16* (2006.01)

(52) U.S. Cl.
CPC .............. *H04L 67/18* (2013.01); *G06F 3/017* (2013.01); *G06F 3/167* (2013.01); *H04W 4/023* (2013.01)

(58) Field of Classification Search
CPC ..... H04W 12/06; H04W 84/12; H04W 12/08; H04W 4/008; H04W 48/10; H04W 88/10; H04W 88/02; H04W 48/18; H04W 76/023; H04W 4/21; H04W 74/00; H04W 72/1252; H04W 72/1257; H04W 74/0833; H04W 74/085; H04W 4/22; H04W 4/021; H04W 4/023; H04W 4/025; H04W 4/04; H04W 12/12; H04W 64/00; H04W 52/0264; G08B 25/008; G08B 19/005; G08B 27/003; G08B 29/185; G08B 25/002; G08B 25/006; G08B 27/005; G08B 3/10; G08B 13/00; G08B 13/196; G08B 25/00; G08B 25/016; G08B 25/10; G08B 25/14; G08B 27/00; G08B 7/06; G08B 25/08; H04L 51/32; H04L 67/306; H04L 67/22; H04L 51/10; H04L 65/1089; H04L 63/083; H04L 2012/2841; H04L 63/061; H04L 63/0815; H04L 63/0861; H04L 63/10; H04L 63/102; H04L 63/1416; H04L 63/16; H04L 67/20
See application file for complete search history.

(56) References Cited

U.S. PATENT DOCUMENTS

| 2002/0072356 A1* | 6/2002 | Yamashita | H04M 1/72533 455/420 |
| 2003/0073432 A1* | 4/2003 | Meade, II | G08C 17/02 455/420 |
| 2005/0249169 A1* | 11/2005 | Fong | H04L 12/2803 370/338 |

(Continued)

*Primary Examiner* — Nimesh Patel
(74) *Attorney, Agent, or Firm* — Dean D. Small; The Small Patent Law Group, LLC (57) ABSTRACT

A computer implemented method, device and computer program device are provided that are under control of one or more processors and are configured with executable instructions. The method collects tracking data from one or more tracking devices independent of the object. The tracking data associates with an object. The method further compares the tracking data to one or more templates to identify the object, determines a location associated with the object based on the comparing and outputs, from an electronic device, a response indicative of the location of the object.

19 Claims, 6 Drawing Sheets

(56) References Cited

U.S. PATENT DOCUMENTS

| | | | | |
|---|---|---|---|---|
| 2007/0263600 A1* | 11/2007 | Sutardja | .............. | H04M 1/2535 |
| | | | | 370/352 |
| 2009/0243836 A1* | 10/2009 | McSheffrey | .............. | A61N 1/39 |
| | | | | 340/524 |
| 2015/0061859 A1* | 3/2015 | Matsuoka | .............. | G08B 27/00 |
| | | | | 340/501 |
| 2016/0088438 A1* | 3/2016 | O'Keeffe | ............... | H04R 27/00 |
| | | | | 455/456.2 |

* cited by examiner

METHOD AND DEVICE TO TRACK OBJECTS

BACKGROUND

Embodiments of the present disclosure generally relate to automatically tracking objects of interest.

Today, electronic devices (e.g., cellular phones, tablet devices, laptop computers) support location services that allow a user to track physical geographic locations of the electronic device. To provide the location service, the electronic device utilizes an internal tracking system, such as a GPS chip set, to periodically broadcast the geographic location of the electronic device to a remote server. In addition, secondary electronic trackers are provided are attachable to an object, to allow indirect tracking of the object by tracking the geographic location of the secondary electronic tracker. For example, the TrackR accessory, RFID tags and the like may be attached to objects to allow indirect tracking of the object.

However, each of the foregoing conventional tracking systems requires internal electronic components that communicate with an external device or server to enable the tracking service. For example, the electronic components may represent a GPS chipset, and RFID circuit and the like. The GPS chipset is used to identify geographic coordinates that are wirelessly transmitted to a remote server. The RFID circuit communicates with a local RFID transmitter when within a broadcast range of the transmitter.

Numerous objects are utilized on a day-to-day basis that do not include an internal tracking system, and do not facilitate attachment to a secondary electronic tracker.

SUMMARY

In accordance with embodiments herein a method is provided. The method is under control of one or more processors and is configured with executable instructions. The method collects tracking data from one or more tracking devices independent of the object. The tracking data associates with an object. The method further compares the tracking data to one or more templates to identify the object, determines a location associated with the object based on the comparing and outputs, from an electronic device, a response indicative of the location of the object.

Optionally, the tracking data and one or more templates may be one or more of image-based, audio-based, voice-based or gesture-based. The object may represent a passive object. The tracking data may represent image-based tracking data collected from a camera of the one or more tracking devices. The comparing may comprise comparing the image-based tracking data to one or more image-based templates that include images of the passive object. The tracking data may represent audio-based tracking data collected from a microphone of the one or more tracking devices. The comparing may comprise comparing the audio-based tracking data to one or more audio-based templates that include audio signatures produced by the object.

Optionally, the tracking data may represent gesture-based tracking data collected from a gesture monitoring circuit of the one or more tracking devices. The comparing may comprise comparing the gesture-based tracking data to one or more gesture-based templates that may include user movement patterns in connection with handling the object. The tracking data may represent a voice-based tracking data collected from a microphone of the one or more tracking devices. The comparing may comprise comparing the voice-based tracking data to one or more voice-based templates that include one or more words or phrases related to the device.

Optionally, the method may generate a user prompt from the electronic device to enter a user specific template related to the object, and record the user specific template. The method may receive a designation of one or more pickup zone, drop-off zone or secure zone and may determine when the object of interest is located at the one or more designated pickup zone, drop-off zone or secure zone. The outputting may comprise outputting an identification of a location and time at which the object was identified by the corresponding tracking device. The method may receive a user request to locate the object. The user request may have a first access level from multiple access levels, identifying whether the object is located in a secure area associated with the first access level, and outputting the user response based on the identifying.

In accordance with embodiments herein, a device is provided. The device comprises a user interface, a processor and a memory storing program instructions accessible by the processor. In response to execution of the program instructions, the processor collects tracking data from one or more tracking devices independent of the object. The tracking data is associated with an object. The processor compares the tracking data to one or more templates to identify the object, determines and output, from the user interface, a response indicative of the location of the object.

Optionally, the user interface may present detailed location information that may include one or more images of the location of the object, with the object emphasized within the image. The object may represent a passive object. The tracking data may represent image-based tracking data collected from a camera of the one or more tracking devices. The comparing may comprise comparing the image-based tracking data to one or more image-based templates that include images of the passive object. The tracking data represents audio-based tracking data collected from a microphone of the one or more tracking devices. The comparing may comprise comparing the audio-based tracking data to one or more audio-based templates that include audio signatures produced by the object.

Optionally, the tracking data may represent gesture-based tracking data collected from a gesture monitoring circuit of the one or more tracking devices. The comparing may comprise comparing the gesture-based tracking data to one or more gesture-based templates that include user movement patterns in connection with handling the object. The tracking data may represent voice-based tracking data collected from a microphone of the one or more tracking devices. The comparing may comprise comparing the voice-based tracking data to one or more voice-based templates that include one or more words or phrases related to the device. The memory may stores a user specific template related to the object.

In accordance with embodiments herein, a computer program product is provided comprising a non-signal computer readable storage medium comprising computer executable code to perform. The program products collects tracking data from one or more tracking devices independent of the object, the tracking data associated with an object, compares the tracking data to one or more templates to identify the object, determines, a location associated with the object based on the comparing and outputting, from an electronic device, a response indicative of the location of the object.

Optionally, the computer program product may further comprise a tracking log that may include an object identifier, a timestamp at which the tracking data was collected, a location associated with the tracking device that collected the tracking data, and a confidence level associated with the tracking data. The tracking log may maintain a running list of multiple entries associated with the object over time.

DETAILED DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The terms "object" and "passive object" refer to an object of interest to be tracked, where the object of interest does not actively utilize a tracking circuit or position determining components (e.g., a GPS chipset), and is not attached to a tracking circuit or position determining components. Non-limiting examples of passive objects include portable or handheld items suitable for day-to-day use by an individual (e.g., keys, wallets, purses, jewelry, watches, eyeglasses, sunglasses, chap-stick, remote controls, charge cords). As another example, the passive object may represent an electronic device (e.g., phone, tablet device, laptop computer) that may include a tracking circuit or position determining components; however the electronic device is in a non-tracking state such that the tracking circuit or position determining components are inactive or otherwise not utilized in connection with embodiments described herein.

The phrase "independent of the object" is used herein to refer to the collection of tracking data by tracking devices in a manner that is electrically independent of and without communication to/from the object. The phrase "independent of the object" shall mean that the tracking devices do not directly or indirectly wirelessly communicate with the object in connection with tracking, do not directly or indirectly transmit RF signals to the object in connection with tracking, and do not directly or indirectly receive RF signals from the object in connection with tracking.

The terms "sighting", "sighted", "hear" and "hearing" refer to an individual instance for which a tracking device collects tracking data that may potentially match to an object of interest, where the tracking data is recorded as a single event. By way of example, a sighting may represent an instance in which a camera captures an image of an object (e.g., a camera in a laptop computer captures a picture of a user placing their glasses on an office desk). As another example, a tracking device may hear a particular object when a tracking device records an audio signature that is potentially matched to an audio-based template for the particular object (e.g., the sound of keys being placed on a kitchen counter).

Figure 1:
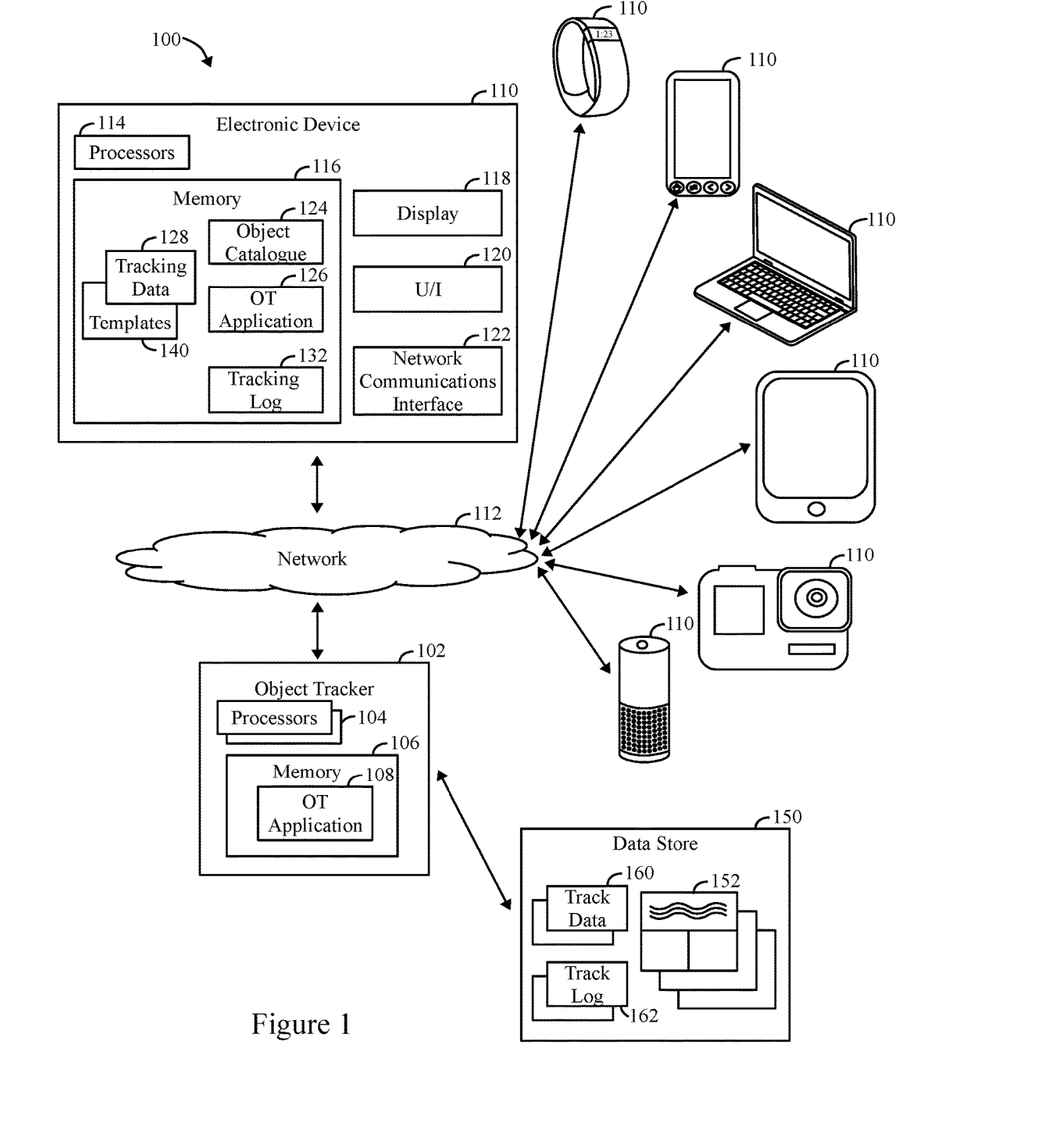
FIG. 1 illustrates a system that tracks passive objects in accordance with embodiments herein.

FIG. 1 illustrates a system 100 that tracks passive objects in accordance with embodiments herein. The system 100 includes one or more electronic devices 110 that communicate with one another over a network 112. Optionally, the electronic devices 110 may communicate through a wholly or partially wired subsystem. The network 112 may represent the World Wide Web, a local area network, a wide area network and the like. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like. In addition, the electronic devices 110 may represent various types of devices configured to record audio and/or voice signatures, detect gestures and movements and the like.

At least one of the electronic devices 110 may be configured to implement object tracking in accordance with embodiments herein. The electronic device 110 that is configured to implement object tracking includes one or more processors 114, memory 116, a display 118, a user interface 120, a network communications interface 122, and various other mechanical components, electrical circuits, hardware and software to support operation of the client device 110. It is recognized that not all electronic devices 110 include a display, user interface, and the like. For example, a fixed or handheld camera may simply include camera related electronics and network circuitry to support communication to and from the camera.

The user interface 120 may include a variety of visual, audio, and/or mechanical devices. For example, the user interface 120 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the user interface 120 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the user interface 120 may include a touch sensitive screen, a non-touch sensitive screen, a text-only display, a smart phone display, an audio output (e.g., a speaker or headphone jack), and/or any combination thereof. The user interface 120 permits the user to select one or more of a switch, button or icon in connection with various operations of the device 110.

The memory 116 can encompass one or more memory devices of any of a variety of forms (e.g., read only memory, random access memory, static random access memory, dynamic random access memory, etc.) and can be used by the processor 114 to store and retrieve data. The data that is stored by the memory 116 can include, but need not be limited to, operating systems, applications, and other information. Each operating system includes executable code that controls basic functions of the communication device, such as interaction among the various components, communication with external devices via a wireless transceivers and/or component interface, and storage and retrieval of applications and data to and from the memory 116. Each application includes executable code that utilizes an operating system to provide more specific functionality for the communication devices, such as file system service and handling of protected and unprotected data stored in the memory 116.

The network communications interface 122 provides a direct connection to other devices, auxiliary components, or accessories for additional or enhanced functionality, and in particular, can include a USB port for linking to a user device with a USB cable. Optionally, the network communications interface 122 may include one or more transceivers that utilize a known wireless technology for communication.

The memory 116 includes, among other things, an object tracking (OT) application 126, object catalogue 124, tracking data 128, a tracking log 132 and one or more templates 140. The memory 116 may store pick-up zones, drop-off zones, secure zones and access levels as described herein. The functionality of the OT application 126 is described below in more detail. The templates 140 may include one or more types of templates that are descriptive of, and associated with, objects of interest. More than one type of template (e.g., images, audio signatures, gestures) may be associated with a single type of object (e.g., eyeglasses), while different templates of the same type (e.g., wallet images) may be associated with different objects (e.g., different types of wallets). For example, image-based templates may include still or video images associated with one type of object, where the images are taken from different angles, with different lighting, and at different distances from the object. As another example, multiple sets of image-based templates may be stored in connection with multiple objects that are of a similar type (e.g., multiple pictures of different sets of keys, multiple pictures of different eye glasses, etc.).

The tracking data 128 may include one or more types of tracking data based on the electronic device 110 that collects the tracking data. The tracking data may be collected over the network 112 from numerous types of electronic devices 110 that implement a tracking operation (also referred to as tracking devices). For example, different types of electronic tracking devices 110 may collect image-based tracking data, audio-based tracking data, voice-based tracking data and gesture-based tracking data.

As explained herein, the OT application 126 utilizes the templates 140 to analyze the tracking data 126 to identify objects of interest. The OT application 126 updates the tracking log 132 based on the analysis and provides feedback to the user concerning locations and/or suggestions regarding where an object may be located. The tracking log 132 maintains various information concerning sightings associated with objects of interest. By way of example, the tracking log 132 may include information concerning a time and location at which an object was identified, the location of the tracking device that collected the tracking data indicative of the location of the object, as well as a confidence indicator regarding a level of confidence that the "sighting" is accurate.

In the foregoing example, the electronic device 110 implements the OT application 126 locally on a device that may be generally present within the physical area of a user. For example, the electronic device 110 may represent the user's cell phone, laptop computer, tablet device, DPA device and the like.

Additionally or alternatively, all or portions of the OT application may be implemented remotely on a remote resource, denoted in FIG. 1 as an object tracker 102. The object tracker 102 may perform limited operations, such as manage storage and creation of templates. The object tracker 102 may provide access to one or more memory 150, and/or implement the OT application. The object tracker 102 communicates with electronic devices 110 through one or more networks 112 to provide access to object catalogs 152 and to implement processes described herein. The object tracker 102 may represent a server or other network based computing environment. The object tracker 102 may represent a single computer system or a collection of computer systems located at a common location or geographically distributed.

The object tracker 102 includes one or more processors 104 and memory 106, among other structures that support operation of the object tracker 102. In accordance with embodiments herein, the object tracker 102 receives requests from various electronic devices 110 and returns resources in connection there with. It is recognized that the object tracker 102 performs other operations, not described herein, such as operations associated with maintaining resources and the like.

The memory 150 may store the object catalogs 152 organized in various manners and related to a wide variety of objects and types of tracking data. The object catalogs 152 may be organized and maintained within any manner of data sources, such as data bases, text files, data structures, libraries, relational files, flat files and the like. The object catalogs 152 include various types of templates corresponding to different types of objects. Optionally, the memory 150 may store tracking data 160, such as when the object tracker 102 receives tracking data from electronic devices 110 that are performing tracking operations. Optionally, the memory 150 may store tracking logs 162, such as when the object tracker 102 performs object tracking operations at the request of an electronic device 110.

Figure 2:
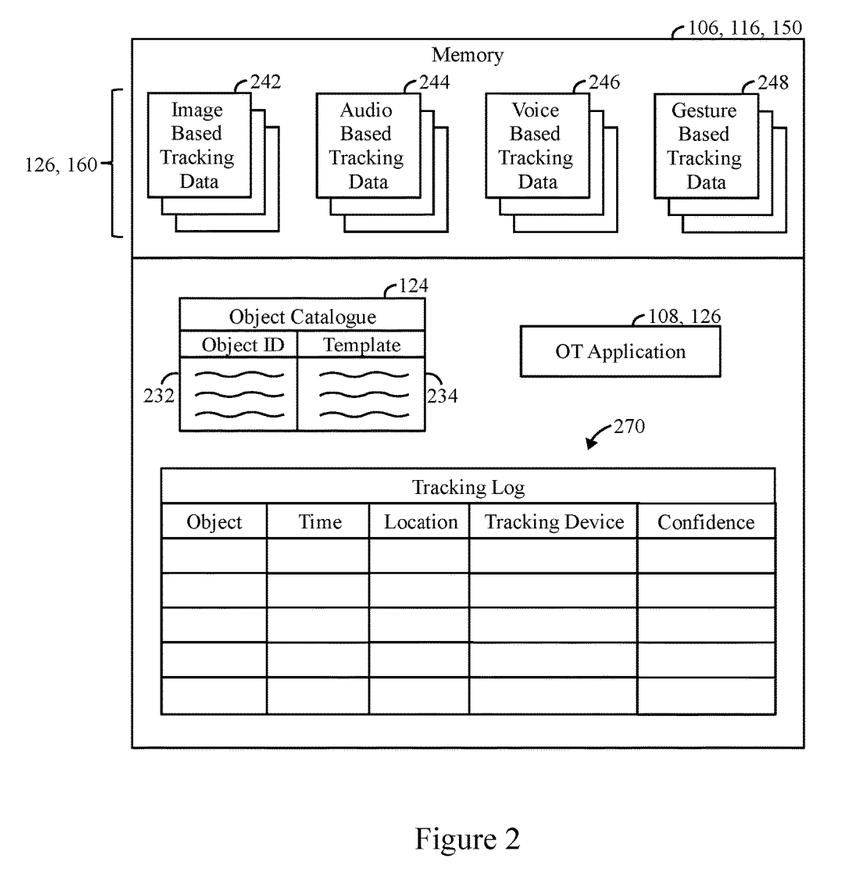
FIG. 2 illustrates a block diagram of the modules, catalogues, data and other information that may be stored within the memory in accordance with embodiments herein.

FIG. 2 illustrates a block diagram of the modules, catalogues, data and other information that may be stored within the memory 106, 116 and/or the memory 150 in accordance with embodiments herein. The OT application 108, 126 includes program instructions accessible by the one or more processors to direct a processor to implement the methods, processes and operations described herein including, but not limited to the methods, processes and operations illustrated in the Figures and described in connection with the Figures. The OT application 108, 126 includes one or more modules that operate in connection the various functions and features as described herein.

The memory 106, 116, 150 stores various types of tracking data (generally denoted at 128, 160), such as image-based tracking data 242, audio-based tracking data 244, voice-based tracking data 246 and gesture-based tracking data 248. The memory 106, 116, 150 also stores the object catalogue 124 which maintains a list 232 of object identifiers associated with various types of objects to be tracked, and templates 234 that may be used in connection with each type of object. As explained herein, the templates 234 may be based on different types of information, such as images, audio, voice content, gestures and the like.

The memory 106, 116, 150 may also maintain a tracking log 270 that is maintained and updated in connection with particular objects presently being tracked. For example, the tracking log 270 may maintain a running list of sightings for a particular object, where each sighting represents a potential detection event where a tracking device identified the object. For example, the tracking log 270 may include information concerning an object identifier, time at which the object was identified, a location of the object identification, and identifier of the tracking device and a confidence level associated with the identification.

Figure 3:
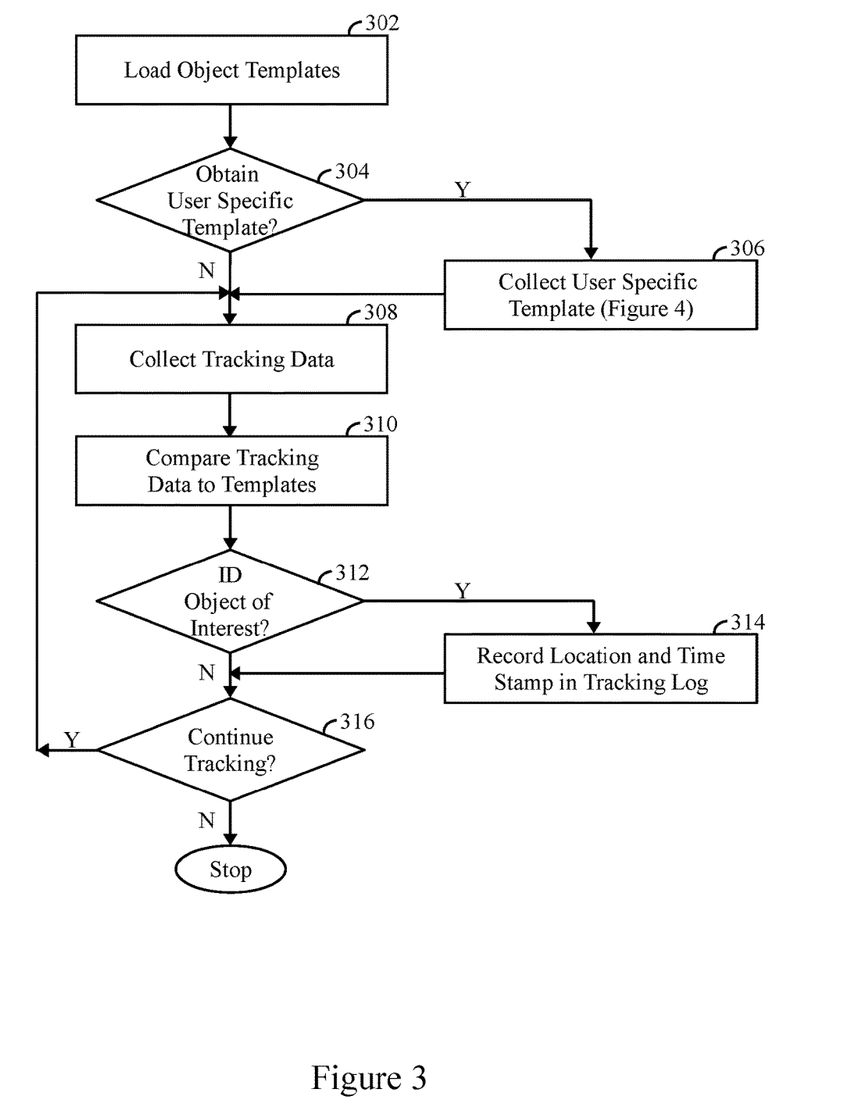
FIG. 3 illustrates a process for tracking passive objects in accordance with embodiments herein.

FIG. 3 illustrates a process for tracking passive objects in accordance with embodiments herein. The operations of FIG. 3 are carried out by one or more processors 114 of the device 110 in response to execution of program instructions, such as in the OT application 126, and/or other applications stored in the memory 116. Additionally or alternatively, the operations of FIG. 3 may be carried out by the processors 104 within one or more servers at the tracking manager 102 in response to execution of program instructions, such as in the OT application 108.

At 302, one or more processors load one or more object templates related to a passive object to be tracked. For example, the object templates may be predefined or baseline templates that are generic for a type of object. For example, the object templates may include one or more image templates for the corresponding type of object (e.g., pictures or videos of different types of keys, wallets, eyeglasses, or sunglasses, chap-stick, cellular phone chargers, television/cable remote controls, tools, clothes, shoes). The object templates may include user specific templates, such as when a user enters pictures, videos, audio signatures for a user specific object (e.g., pictures of an individual set of keys, a specific wallet or purse, the sounds produced when an individual sets their keys on a specific home kitchen countertop, office desk, and the like).

Additionally or alternatively, one or more sets of object templates may be uploaded to an electronic device 110 from a database or server (e.g., object tracker 102). Additionally or alternatively, a user may identify generic baseline object templates, such as from Internet searches, photographs and the like.

At 304, the one or more processors determine whether user specific templates already exist and/or whether to obtain user specific templates. For example, at 304, the processors may prompt the user with an inquiry as to whether the user desires to enter pictures, video, audio or other data associated with particular objects that the user wants to track. Additionally or alternatively, a user may enter an indication to instruct the processors to prepare to collect user specific templates. When user specific templates are to be collected, flow branches to 306. Otherwise, flow continues to 308.

At 306, the one or more processors collect the user specific templates. At 306, the user specific templates are recorded in the object catalog 124, and flow continues to 308. An example of one process that may be utilized to collect user specific templates as described below in connection with FIG. 4.

At 308, the one or more processors collect tracking data associated with the object of interest. The tracking data is collected independent of the object. The collection of tracking data is performed by the tracking devices in a manner that is electrically independent without communication to/from the object. The tracking devices do not directly or indirectly wirelessly communicate with the object to obtain the tracking data. The tracking devices do not directly or indirectly transmit RF signals to the object to obtain the tracking data. The tracking devices do not directly or indirectly receive RF signals from the object to obtain the tracking data.

The processors also collect tracking device identifying information for the device(s) that record the tracking data, and when available, position information associated with the tracking device. When tracking devices are located at fixed locations, such as digital personal assistant devices, smart TVs, stereo systems, fixed cameras and the like, the location of the tracking device may be utilized to determine the location of the object. The nature of the tracking data may be based on the types of tracking devices available to perform tracking, as well as the types of templates stored in the object catalog. For example, when the object catalog only includes image templates, the tracking data may represent a collection of images from tracking devices within the system.

In connection with image recognition, embodiments herein may utilize cameras to collect image-based tracking data. The cameras may be provided in various manners. For example, a camera may be mounted to a wearable device (e.g., a go pro device, Google glasses) that is configured to collect images of objects that a user picks up, puts down, views or are otherwise in visual proximity to the user. For example, the cameras make collect image-based tracking data for objects a user picks up, puts on a table, counter, desk, nightstand and the like. Additionally or alternatively, cameras may be positioned at fixed locations or locations independent of movement by the user. For example, fixed cameras may be positioned in select areas (e.g., a home living room, a kitchen, an office, etc.). Additionally or alternatively, an in-home video surveillance system may be utilized to collect image-based tracking data. Additionally or alternatively, cameras within a laptop or desktop computer may be utilized to collect images for the field-of-view of the camera (e.g., for an area surrounding an office or home office). Additionally or alternatively, cameras within a smart phone or tablet device may be utilized to collect images for the field-of-view of the camera. The tracking devices and/or electronic device 110 may analyze the images to identify when the object is no longer in the user's possession (e.g., based on separation therebetween, no user in the image, surrounding surfaces/structures).

Additionally or alternatively, embodiments herein may utilize audio-based tracking, where audio signals may be collected at 308 as the tracking data. The audio signals represent an acoustic signature that may be collected from various types of tracking devices that are at fixed locations or within mobile devices. For example, a microphone of a smart phone or tablet device may record audio signals that are provided as tracking data. Optionally, a microphone of a laptop or desktop computer, as well as any other audio/visual device (smart television, stereo, etc.) may be used to collect tracking data. As explained herein, the audio tracking data may be utilized to identify when an object has been set down, placed in a drawer, placed on a countertop, hard surface, cloth surface dropped, shaken while in a pocket, opened or closed, or otherwise handled.

Additionally or alternatively, embodiments herein may utilize a voice-based tracking, where voice signals may be collected at 308 as the tracking data. The voice signals may be collected by the same types of tracking devices as discussed above in connection with collecting audio signals. The voice signals may represent phrases, words or other spoken content by an individual, numerous different persons and the like. The voice signals may represent content played by an A/V device (e.g., television, stereo).

Additionally or alternatively, embodiments herein may utilize gesture-based tracking, where gestures based tracking data may be collected at 308. For example, gesture-based tracking data may be collected from wearable tracking devices and/or external cameras that monitor and detect select movement patterns of hand and body gestures by the user in connection with an object of interest. For example, the gesture may relate to handling the object, pointing at the object, carrying the object, touching the object and the like. Non-limiting examples of wearable devices that may be used as tracking devices include a MyoBand device, Project Soli device, FitBit devices and the like. Additionally or alternatively, the gesture related data may be collected by a camera that tracks movement patterns of the user.

At 310, the one or more processors compare the tracking data to one or more corresponding templates. For example, image-based tracking data may be compared to one or more image-based templates utilizing various object recognition techniques. As another example, audio-based tracking data may be compared to one or more audio-based templates utilizing various audio correlation techniques. As yet further examples, voice and/or gesture-based tracking data may be compared to one or more voice and/or gesture-based templates utilizing various correlation techniques.

At 312, the one or more processors determine whether the comparison at 310 indicates that a target object of interest has been identified from the tracking data. As one example, the processors may generate a correlation rating between the tracking data and one or more templates, where the correlation rating is indicative of a degree to which the tracking data and template match. When the correlation rating exceeds a predetermined threshold, the processors may determine that a match has occurred and that the tracking data corresponds to the object within the one or more template. Various alternative object recognition techniques may be utilized to identify objects of interest from tracking data.

Optionally, at 312, the tracking data may be compared to a single template, or multiple templates related to a single type of data (e.g., only image-based, only audio-based, etc.). Additionally or alternatively, two or more types of tracking data may be analyzed to determine corresponding correlation ratings obtained in connection there with. The correlation ratings from the two or more types of tracking data may then be separately compared to corresponding thresholds and/or combined (e.g., in a weighted sum) and compared to a threshold to determine a confidence that the target object of interest was identified. For example, audio-based tracking data and templates may be compared and the processors may determine that a set of keys have been placed on a kitchen countertop. However, the audio signals may not be sufficiently distinct to distinguish between various sets of keys within a single-family. Image-based tracking data and templates may be then compared to determine which set of keys were placed on the kitchen countertop.

Optionally, the image-based tracking data and templates may be utilized to merely identify the person placing the keys on the table or countertop (e.g., a male adult, female adult, male teenager, female teenager). Based on the gender and age determined from the image-based tracking data, the processors may determine that the keys correspond to a particular individual's vehicle (e.g., the father's, mother's, teenage son, teenage daughter).

As a further example, gesture-based tracking data and templates may be analyzed to indicate that a user has removed something from a pocket. In some instances, the gesture-based tracking data may be specific enough to indicate that the user has removed something from a particular pocket (e.g., a side pocket on cargo pants, a right rear pocket). A gesture-based template may include information indicating that the user only stores his wallet in the right rear pocket, and us any gesture-based tracking data indicating the removal of anything from a particular pocket may be labeled as a particular target object of interest. Consequently, the gesture-based data may be sufficient to identify the target object as a user's wallet.

Additionally or alternatively, the gesture-based tracking data may be less specific, indicating merely that the user has removed something from a pocket without knowing which pocket. Optionally, the gesture-based template may not assume that everything in a particular pocket is the object of interest. Hence, the gesture-based tracking data, when analyzed alone, may exhibit a low level of confidence concerning a target object. Optionally, audio, voice and/or image-based tracking data and templates may be utilized to further identify the object removed from the pocket.

As a further example, voice signals collected by an electronic device may be analyzed at 312 for select spoken content (e.g., words or phrases). When the spoken content matches or at least is similar to a voice-based template, an object of interest may be identified. A level of confidence may be assigned to the identification of the object of interest based on the correlation between the spoken content and the corresponding templates.

When a target object is identified at 312, flow branches to 314. Otherwise, flow continues to 316. At 314, the one or more processors record a location and time stamp associated with the object of interest in a tracking log. The tracking log may record the object identifier, a timestamp at which the tracking data was collected, a location associated with the tracking device that collected the tracking data, a tracking device identifier, a confidence level associated with the identification and the like. The tracking log may maintain a single entry for an object, where the single entry corresponds to the most recent instance in which an object was cited. Additionally or alternatively, the tracking log may maintain a running list of multiple entries associated with an individual object of interest, such as to create a breadcrumb trail of the movement of the object over time. The confidence levels may be utilized to indicate a confidence with which the object was identified at any particular time. For example, a fixed camera in a kitchen may be utilized to determine with a high level of confidence that an individual placed a set of keys or glasses on a kitchen table at a certain point in time. Subsequently, a DPA device may collect audio-based tracking data that indicates with a medium level of confidence that the keys or glasses were "heard" being set on a living room bookshelf.

As a non-limiting example concerning the use of voice-based tracking data and templates, one or more DPA devices may record spoken content from a user or from television or other audio/video device. The spoken content may relate to selecting a movie or other television program to watch. Optionally, the spoken content may include a transition between the audio associated with one television program and another television program. Based on spoken content related to movies or television programs, or the transition between audio of different programs, the one or more processors may determine that a remote control device is present in the room with the DPA device. The location of the DPA device and the time at which the audio-based tracking data was recorded are saved as a record location and timestamp in the tracking log.

Thereafter flow moves to 316. At 316, the one or more processors determine whether to continue the tracking operation. If so, flow returns to 308, and the tracking process is repeated for new tracking data. Otherwise, the process ends. It is understood that the operations at 302-306 may be performed separately in independent of the operations at 308-316. For example, generic and user specific object templates may be collected at various points in time, such as during registration and set up of a system, any time at which a new object is to be added, when a new user is to be added, and the like. Separate and independent therefrom, the operations at 308-316 may be performed continuously, at select times of day, at the instruction of a user, in a manner programmed by the user and the like.

Figure 4:
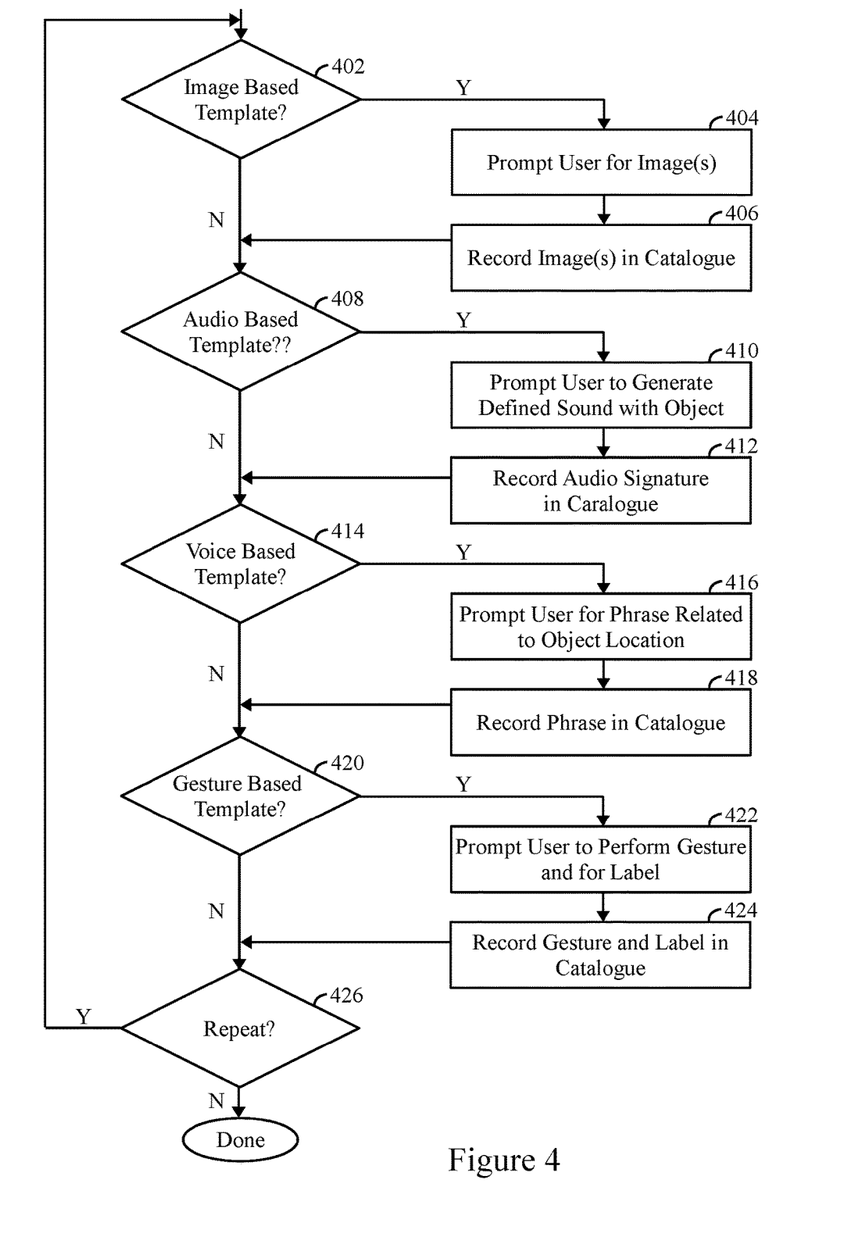
FIG. 4 illustrates a process for collecting different types of user specific templates in accordance with embodiments herein.

FIG. 4 illustrates a process for collecting different types of user specific templates in accordance with embodiments herein. While the operations of FIG. 4 are illustrated as a common continuous flow, it is recognized that anyone or more of the different subsections may be implemented alone or in different combinations. For example, one or more of the different types of templates may be collected alone or in combination with one or more of the other types of templates.

At 402, the one or more processors determine whether an image-based template is to be collected. If so, flow moves to 404. Otherwise, flow moves to 408. At 404, the one or more processors prompt the user for one or more images (e.g., still images or video images) related to an object of interest. For example, the collection operation may involve the user taking pictures or video for one or more objects of interest, designating previously stored pictures or videos and/or selecting pictures/videos from a third-party source.

At 406, the images are recorded in the object catalog in connection with the corresponding object identifier. For example, the catalog may include an identifier for a user's keys, in combination with the collection of templates that represent multiple images (e.g., pictures), taken from different angles, different distances, with the keys in different orientations and configurations, and the like. Optionally, the user may be afforded the opportunity to enter additional information regarding the object or a location associated with the image.

At 408, the one or more processors determine whether an audio-based template is to be collected. If so, flow moves to 410. Otherwise, flow moves to 414. At 410, the one or more processors prompt the user for one or more audio recordings (audio signatures) related to an object of interest. For example, when the object of interest represents keys, the audio templates may represent the sound of the keys being placed on different surfaces, the sound made when the keys are handled (e.g., shaken or moved), the sound when the keys are in a user's pocket (while the user walks, or otherwise moves), etc.

At 412, the audio signatures are recorded in the object catalog in connection with the corresponding object identifier. For example, the catalog may include an identifier for a user's keys, in combination with the collection of audio templates that represent recordings taken when the keys are placed on different surfaces (e.g., kitchen counter, drawer, table, vehicle console), or placed within different storage containers (e.g., purse, backpack, briefcase). The recordings for the sounds made by the keys may be taken at different angles, from different distances, with a different background noises and with different hand gestures (e.g., dropping the keys, setting down the keys alone, setting down the keys in combination with other objects). Different sets of keys may exhibit different sounds when placed on the same surface. For example, a small set of metal keys may exhibit a different sound than a larger set of metal keys, and/or a set of keys with plastic handles, and/or a set of keys with additional objects on the key ring (e.g., a lanyard, key FOB, jewelry related items and the like.

As another example, when the audio-based template relates to reading glasses or sunglasses, one or more audio signatures may be recorded in connection with closing the stems for the glasses and/or placing the glasses in a glass holder. As another example, when the object of interest represents an audio/video device remote control, the audio signatures may be recorded in connection with television shows. Optionally, the user may be afforded the opportunity to enter additional information regarding the object or a location associated with the audio recording, such as access levels to be used with secure zones, combinations for pick-up zones, etc.

At 414, the one or more processors determine whether a voice-based template is to be collected. If so, flow moves to 416. Otherwise, flow moves to 420. At 416, the one or more processors prompt the user for one or more voice recordings related to an object of interest. For example, the voice-based templates may represent phrases spoken by a user concerning an object of interest, object-related topics, regions in which objects of interest may be placed and the like. For example, when the object of interest represents keys, the phrases may relate to operating a vehicle, running errands, going somewhere, etc. When the object of interest represents a wallet or purse, the recorded phrases may relate to money, credit cards, a driver's license or other documents maintained in a wallet or purse.

Additionally or alternatively, voice-based templates may be determined at 416 and manners other than directly recording the voice of a user. For example, at 416, the user may select key phrases or words from a list of candidate phrases/words presented on an electronic device. At 418, the voice-based templates are recorded in the object catalog in connection with the corresponding object identifier.

At 420, the one or more processors determine whether a gesture-based template is to be collected. If so, flow moves to 422. Otherwise, flow moves to 426. At 422, the one or more processors prompt the user to perform one or more gesture related templates related to an object of interest. For example, when the object of interest represents a wallet, the gesture related template may correspond to the gestures by the user to store the wallet in (or take the wallet out of) a back pocket, a side pocket (e.g., in cargo pants), a jacket pocket and the like. When the object of interest represents keys, the gesture related template may correspond to the gestures by the user to put keys in a pocket (or take keys out of the pocket). As a further example, when the object of interest represents eyeglasses or sunglasses, the gesture related template may represent the movements by an individual to remove glasses from their face, close the glasses in place the glasses on a table or in a storage case. Additionally, the gesture related template may represent the movements by an individual to remove glasses from a case, open the glasses and place the glasses on the user's face.

At 424, the voice-based templates are recorded in the object catalog in connection with the corresponding object identifier. At 426, the one or more processors determine whether to repeat one or more of the foregoing operations to store templates. If so, flow returns to 402. Otherwise the process ends. In connection with the foregoing operations, one or more types of templates may be generated and stored in an object catalog. The various types of templates may be stored in a common object catalog. Additionally or alternatively, separate object catalogs may be maintained in connection with image, audio, voice and gesture-based templates.

Additionally or alternatively, location and/or collection device identification information may be recorded in the object catalog when recording the various types of templates. For example, when an audio-based template is recorded, identifying information for the device and/or a location of the device may also be recorded. For example, when a digital personal assistant (DPA) device (e.g., Alexa® device by Amazon, Now® device by Google) is utilized to record audio-based templates, a device identifier and a location of the DPA device may also be stored in the object catalog. The DPA device may "hear" keys being set on a table, eye glasses opened or closed, an eyeglass holder opened or closed, a wallet or purse set down or picked up. The identifying information and location of the DPA may then be used to track the location at which subsequent audio tracking data is collected and at which the audio-based template was recorded.

The operations of FIG. 4 may be repeated numerous times at different locations within an individual user's environment. For example, a user may record multiple user specific audio-based templates by walking through a home and handling and object of interest in various manners. For example, a user may set a set of keys on various surfaces throughout a home, office or other environment that is monitored. As the user steps through the process of setting the keys at various locations, the available tracking devices monitor the related regions and record the corresponding types of templates. For example, microphones record the audio signatures produced when the glasses, wallets, keys are set on various surfaces throughout a home, on various locations within an office, placed in different drawers and the like. Cameras record images/videos of the glasses, wallets, keys when set on various surfaces, placed in different drawers, etc.

Figure 5:
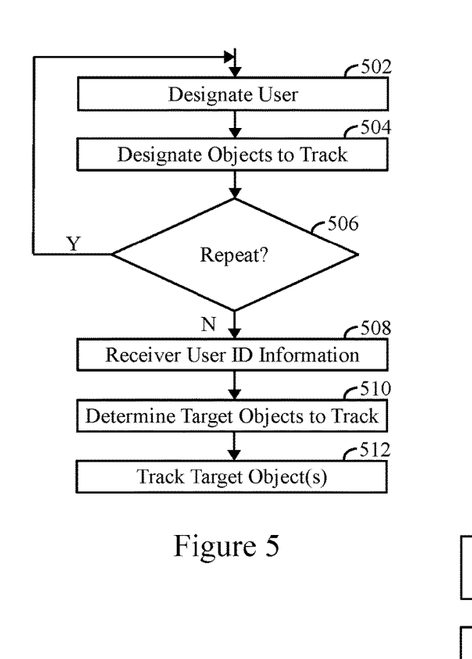
FIG. 5 illustrates a process for automatically tracking target objects in connection with individual users in accordance with embodiments herein.

FIG. 5 illustrates a process for automatically tracking target objects in connection with individual users in accordance with embodiments herein. The operations at 502-506 represent a pre-programming process or initial configuration process to associate particular objects with individuals. At 502, the one or more processors receive inputs to designate a particular user. At 504, the one or more processors receive information designating one or more objects to be tracked in connection with the corresponding individual user. At 506, the one or more processors determine whether to repeat 502-504 in connection with additional users and/or additional objects. If so, flow returns to 502. Otherwise, flow advances the 508. At 508, the one or more processors enter a data tracking loop. For example, the process of FIG. 5 may be implemented in connection with tracking users who initially walk in a door at a home and may have various objects in their hands. For example, each day when an adult user comes home, when the user walks in the door, down the user may put their wallet, cell phone, keys and sunglasses.

At 508, the one or more processors may receive user identification information. For example, when an individual walks in the door, a camera mounted in the kitchen may collect image data, such as an image or video of the person walking through the door. The one or more processors may analyze the image data to identify the user, such as through various image recognition techniques. Additionally or alternatively, the user may be identified based on sound. For example, audio signals may be collected and analyzed for audio signatures and/or voice recognition to identify different individuals. Additionally or alternatively, the user may be identified based on gestures.

At 510, the one or more processors determine which objects of interest (also referred to as target objects) are to be tracked in connection with the user identified at 508. For example, when a female user walks in the door, the determination at 510 may be to track the location of a purse and sunglasses. When a male user walks in the door, the determination at 510 may be to track the location of a wallet and keys. At 512, the one or more processors begin the tracking process described above in connection with FIG. 3 to track the target objects identified at 510.

The operations of FIG. 5 allow separate configurations to be defined in connection with individual users. For example, when adolescents and teenagers are in a kitchen or family room, it may be desirable to track the location of a phone, remote control, cell phone chargers and other items that adolescents and teenagers have a tendency to misplace.

In accordance with embodiments herein, objects may be tracked in connection with designated pick-up, drop-off and secure zones. A drop-off zone may represent a region, within the surveillance range of one or more tracking devices and in which an object is normally stored based on normal user usage. When objects are stored in an expected drop-off zone, tracking may not be necessary. However, when an object is left at a location outside of a drop-off zone, in accordance with embodiments herein, a notification may be provided to a user that the object is stored in an atypical storage location. Alternatively, certain objects may be designated to remain within a designated drop-off zone at all times (e.g., a parent's cell phone charger), and should never leave the designated drop-offs owned (e.g., when children borrow the parent's cell phone chargers).

Figure 6:
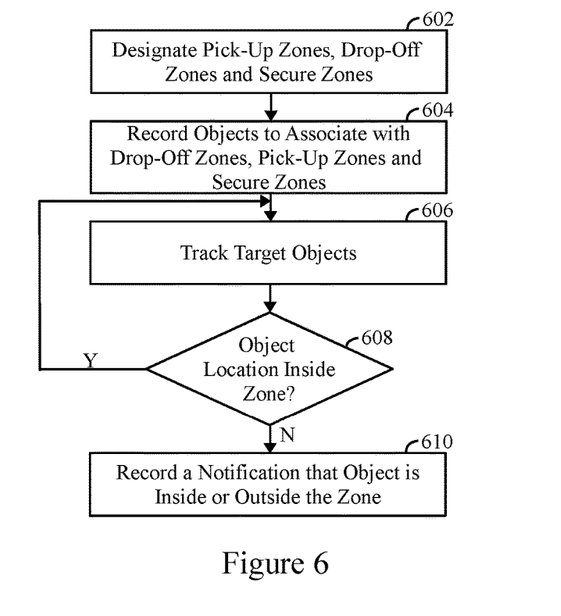
FIG. 6 illustrates a process for tracking objects in connection with designated zones in accordance with an embodiment herein.

FIG. 6 illustrates a process for tracking objects in connection with designated zones in accordance with an embodiment herein. Nonlimiting examples of designated zones include pickup zones, drop-off zones and secure zones. At 602, one or more processors receive a designation of one or more pickup zones, drop-off zones or secure zones. Nonlimiting examples of pickup zones, represent an area where a user normally stores a group of items that the user carries with himself/herself each day. Non-limiting examples of drop-off zones are a locations where keys are stored (e.g., by a door, and a garage, on a bedroom nightstand). For example, the drop-off zone designation may be entered as a region within the field of view of a fixed camera. Additionally or alternatively, when a DPA device is used as a tracking device, the microphone to audio range of the DPA device may be designated as a drop-off zone.

A secure zone may represent an area where only select individuals have authority to ask questions concerning the location of objects. When a zone is designated as a secure zone, only users having the requisite level of access will be informed of objects found in the secure zone drop-off zone. For example, members of the family may designate "hiding areas" or "secret areas" to hide certain items from their kids or spouse (e.g., Christmas presents). Only users with the appropriate access level will be informed by the system of items in the hiding area. For example, the use of access levels may avoid children or spouses from requesting "where are my Christmas or birthday presents hidden?"

At 604, the one or more processors record a list of one or more objects associated with the drop-off zone. For example, the user may designate a surveillance area for a camera and indicate a list of objects that are normally stored in the location.

Additionally or alternatively, individual objects may be assigned access levels. When an object is assigned access level, only users having the appropriate access level may request the processes herein to search for the object. For example, when one child hides their Halloween candy, the candy may be designated with an access level limited to the child. Siblings of the owner of the Halloween candy would not be able to submit request such as "where is Sophie's hollowing candy?".

At 606, the one or more processors begin tracking target objects as explained herein (e.g., in accordance with the operations described above in connection with FIG. 3). When a target object is identified at 606, flow moves to 608. For example, a DPA device may hear an object being dropped or otherwise sense a user putting down an object. At 608, the one or more processors determine whether the target object is located inside or outside of a drop-off zone. When a target object is located within a designated drop-off zone, no further action is required and flow returns to 606 to continue tracking target objects. However, when an object is located outside of a designated drop-off zone, flow branches to 610.

At 610, the one or more processors records a notification to the user that the object is outside of the designated drop-off zone. For example the recorded notification may represent adding the object to an out-of-zone list that may be maintained at various electronic devices. The out-of-zone list may keep track of objects that are stored in potentially unusual locations, to afford quick access to the list for future reference when a user may request the location of a particular object.

Optionally, the notification may be output to the user at 610 in addition to or in place of being stored on an out-of-zone list. For example, the output of the notification may be a text message sent to a cellular phone, tablet or other electronic device (e.g., "Max is using Dad's cell phone charger). Optionally, the output of the notification may be an audio message that is played by an electronic device (e.g., cellular phone, DPA device), such as "Abby just took the car keys". Optionally, the output of the notification may be a vibratory notice provided by a wearable device.

Additionally or alternatively, the tracking operation of FIG. 6 may be performed in connection with pickup zones where a combination of known objects are normally stored and are picked up on a routine basis as a group. For example, embodiments herein may be programmed with or automatically learn, through machine learning, over time, a combination of objects that individuals usually carry on a day-to-day basis. For example, each day a user goes to work, the process may be programmed with or learn the combination of objects that the user usually takes to work (e.g., cell phone, keys and wallet). For example, a user may program a pickup zone (at 602) and record objects associated with the pickup zone (at 604). Each day when the user goes to work, the user may pick-up one or more of the combination of objects. At 606, embodiments herein track the objects being picked up. At 608, the one or more processors determine whether one or more of the combination of objects was not picked up on a particular occasion that is normally picked up. When an object is left in a pickup zone that is otherwise normally picked up, a notification may be provided to the user (e.g., text, audio, vibratory) to remind the user to pick-up the additional object.

Figure 7:
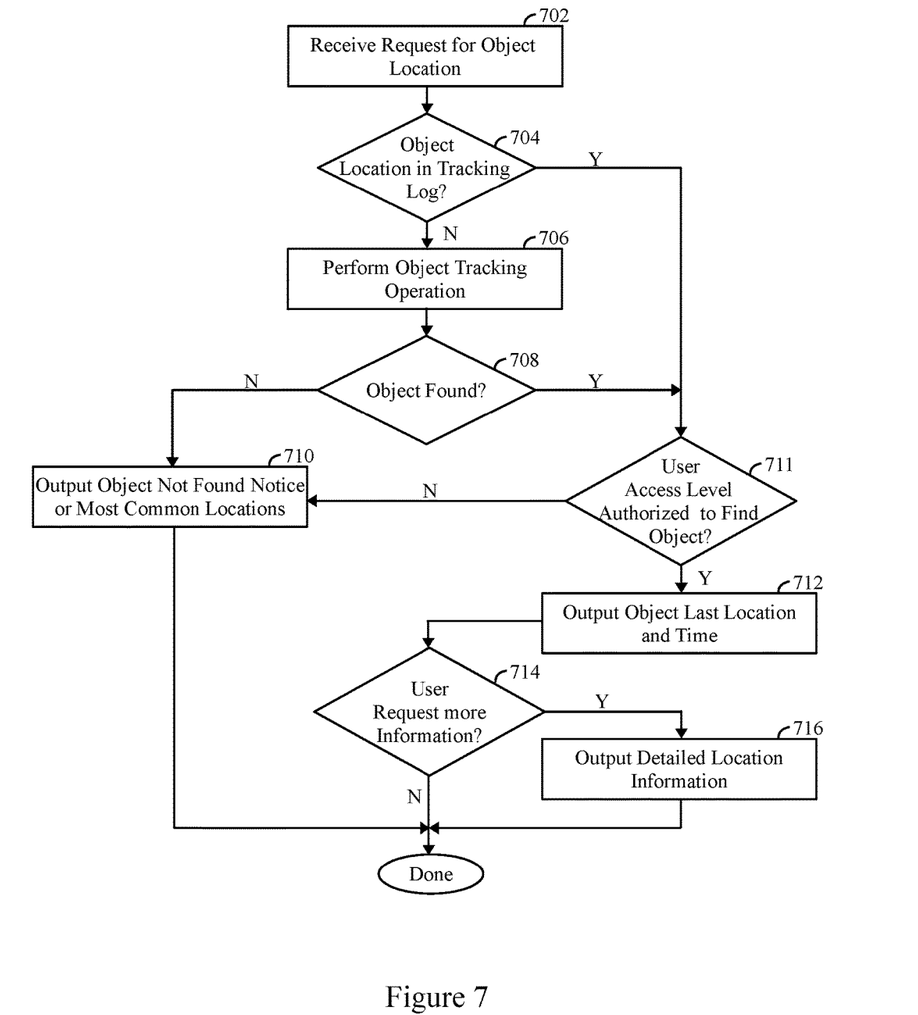
FIG. 7 illustrates a process for supporting user interaction with the object tracking processes in accordance with embodiments herein.

FIG. 7 illustrates a process for supporting user interaction with the object tracking processes in accordance with embodiments herein. At 702, the one or more processors of the electronic device 110 receive a request from the user for the location of an object. Optionally, when a user request location information for an object, the one or more processors may prompt the user as to whether the system should track future locations of the object going forward. For example, the electronic device may indicate "I'm not tracking that object, do you want me to begin tracking it?". Optionally, the one or more processors may unilaterally decide to track certain objects. For example, the one or more processors may determine that objects are in a crowded environment and warrant tracking even when a user does not request tracking.

Additionally or alternatively, the tracking operations described herein may be initiated without receiving a particular user request. For example, a tracking operation may be initiated based on a likelihood that a user will be able to see a particular object. For example, the one or more processors may determine whether an object is located in an open area where it is easily to be seen (e.g., kitchen countertop near a door) or is in a cluttered area (cluttered countertop or drawer). As another example, the one or more processors may determine whether the object is located where the usable are normally stores the object or is in an atypical location. Once an object is left in an atypical location, the one or more processors may initiate the processes described herein automatically and without user request.

At 704, the one or more processors review the tracking log to determine whether a present location of the object is already known. When a present location is already known, flow advances to 711. When a present location of the object is not known from the tracking log, flow advances to 706. At 706, the one or more processors perform an object tracking operation, such as described herein. At 708, the one or more processors determine whether an object has been found. When the object location is not found, flow moves to 710.

At 710, the one or more processors provide an output notification indicating that the object was not found. Additionally or alternatively, the one or more processors may provide historic location information, such as past locations where the object was located. For example, the one or more processors may not know a current exact location of an object, but could tell the user "I do not know where the object is, but I have seen it in these places in the past . . . ".

Returning to 708, when the object location is identified at 708, flow moves to 711. At 711, the one or more processors determine a user access level associated with a user request to locate an object. For example, different members of a family or business may be afforded different levels of access/privileges. The levels of access/privileges may be related to locating particular types of objects or related to particular regions within the environment being monitored. For example, children may not be given the level of access/privileges to locate their parents wallet or car keys. As another example, a husband or wife may be afforded the opportunity to designate a "secure" area as a secret hiding place (e.g., for Christmas presents). When an object is located in a secure zone, only the authorized husband or wife will be informed of the location of the object.

At 711, the one or more processors determine the access level associated with the user request. Different users will have different levels of access. The processors identify whether the object is located in a secure zone that is associated with the access level of the user request. When the user request does not have a user access level associated with the secure zone, flow moves to 710. At 710, and output is provided to indicate either that the object is not found or the user does not have authorization to the secure zone where the object is located. Returning to 711, when the user request has the user access level associated with the secure zone, flow moves to 712.

At 712, the electronic device 110 provides an output notification indicating the last location where the object was located. Optionally, the output notification may also identify the time at which the last object location was determined. Optionally, flow may stop at this point in the process. Alternatively, flow may continue to 714. At 714, the one or more processors may determine whether a user request for more information was received. For example, the information provided at 710 may not be sufficient for the user to locate the object. Consequently, the user may request for a more detailed explanation or more historic information regarding the objects location. At 714 when a user request is received, flow moves to 716. At 716, the electronic device provides detailed location information concerning the object. For example, the detailed location information may include a summary of prior sightings of the object. For example, when searching for keys, the detailed location information may indicate that at 5:30 PM the keys were viewed on the kitchen counter near the garage door. At 5:45 PM, the DPA device in the living room heard the keys being placed on an end table. At 6:15 PM, the DPA device in the kitchen heard "John" say he was "moving the car", or "going to get ice cream". The foregoing example represents one non-limiting example of a manner in which a breadcrumb trail may be provided from a tracking log.

Optionally, the detailed location information at 716 may include more specific information about a particular location. For example, when the request at 702 asks "where is my wallet", the output notification at 710 may indicate that "the wallet is in the kitchen". The object (e.g., wallet) may be located in an area cluttered or busy with multiple other items and may not be readily visible to the user. Accordingly, at 714, the user may indicate "I cannot find my wallet in the kitchen, give me more detailed information". In response, at 716, the electronic device may output a more detailed explanation of the location of the object. For example, the electronic device may say "the wallet is near the coffee maker", "the wallet is under the briefcase", "the wallet is in the kitchen drawer near the toaster", "the wallet is in your coat pocket hanging in the kitchen". The foregoing are nonlimiting examples of more detailed information.

As another example, the object may represent a remote control for the television. At 710, the electronic device may indicate that "the remote control was last used in the living room at 6:30 PM". However, some users (e.g., adolescence) may leave the remote control on the floor, in the couch cushions or other locations difficult to find. Accordingly, at 714, the user may request more information (e.g., "who last used the remote", "where in the living room is the remote"). In response thereto, at 716, the electronic device may output detailed location information, such as "Max left the remote control in the couch cushion", "Abby left the remote control under the leather chair".

Additionally or alternatively, the detailed location information may include one or more images (still or video) of a location of the object, with the particular object emphasized (e.g., colored, enlarged, highlighted, outlined) within the image. For example, it may be beneficial to use an image with the object emphasized when the object is located among multiple other objects or items.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
under control of one or more processors configured with executable instructions;
collecting tracking data from one or more tracking devices independent of an object, the tracking data associate with the object, the tracking data represents audio-based tracking data collected from a microphone of the one or more tracking devices;
comparing the tracking data to one or more templates associated with a type of object to identify the object, wherein the comparing comprises comparing the audio-based tracking data to one or more audio-based templates that include audio signatures produced by the object;
determining a location associated with the object based on the comparing; and
outputting, from an electronic device, a response indicative of the location of the object.

2. The method of claim 1, wherein the tracking data and one or more templates further include one or more of image-based, voice-based or gesture-based.

3. The method of claim 1, wherein the audio-based tracking data represents a voice-based tracking data collected from the microphone of the one or more tracking devices, the comparing comprising comparing the voice-based tracking data to one or more voice-based templates that include one or more words or phrases related to the object.

4. The method of claim 1, further comprising generating a user prompt from the electronic device to enter a user specific template related to the object, and recording the user specific template.

5. The method of claim 1, further comprising receiving a designation of one or more pickup zone, drop-off zone or secure zone, and determining when the object of interest is located at the one or more designated pickup zone, drop-off zone or secure zone.

6. The method of claim 1, wherein the outputting comprises outputting an identification of a location and time at which the object was identified by the corresponding tracking device.

7. The method of claim 1, further comprising receiving a user request to locate the object, the user request having a first access level from multiple access levels, identifying whether the object is located in a secure area associated with the first access level, and outputting the user response based on the identifying.

8. A method, comprising:
under control of one or more processors configured with executable instructions;
collecting tracking data from one or more tracking devices independent of an object, the tracking data associate with the object;
comparing the tracking data to one or more templates associated with a type of object to identify the object;

determining a location associated with the object based on the comparing; and outputting, from an electronic device, a response indicative of the location of the object, wherein the object represents a passive object, the tracking data representing image-based tracking data collected from a camera of the one or more tracking devices, the comparing comprises comparing the image-based tracking data to one or more image-based templates that include images of the passive object.

9. A method, comprising:

under control of one or more processors configured with executable instructions;

collecting tracking data from one or more tracking devices independent of an object, the tracking data associate with the object;

comparing the tracking data to one or more templates associated with a type of object to identify the object;

determining a location associated with the object based on the comparing; and outputting, from an electronic device, a response indicative of the location of the object, wherein the tracking data represents gesture-based tracking data collected from a gesture monitoring circuit of the one or more tracking devices, the comparing comprising comparing the gesture-based tracking data to one or more gesture-based templates that include user movement patterns in connection with handling the object.

10. A device, comprising:

a user interface;

a processor;

a memory storing program instructions accessible by the processor, wherein, responsive to execution of the program instructions, the processor performs the following:

collect tracking data from one or more tracking devices independent of an object, the tracking data associate with the object;

compare the tracking data to one or more templates associated with a type of object to identify the object;

determine a location associated with the object based on the comparing; and output, from the user interface, a response indicative of the location of the object, wherein the tracking data represents audio-based tracking data collected from a microphone of the one or more tracking devices, the comparing comprises comparing the audio-based tracking data to one or more audio-based templates that include audio signatures produced by the object.

11. The device of claim 10, wherein the tracking data and one or more templates further comprises one or more of image-based, voice-based or gesture-based.

12. The device of claim 10, wherein the tracking data represents voice-based tracking data collected from a microphone of the one or more tracking devices, the comparing comprising comparing the voice-based tracking data to one or more voice-based templates that include one or more words or phrases related to the device.

13. The device of claim 10, wherein the memory stores a user specific template related to the object.

14. A device, comprising:

a user interface;

a processor;

a memory storing program instructions accessible by the processor, wherein, responsive to execution of the program instructions, the processor performs the following:

collect tracking data from one or more tracking devices independent of an object, the tracking data associate with the object;

compare the tracking data to one or more templates associated with a type of object to identify the object;

determine a location associated with the object based on the comparing; and output, from the user interface, a response indicative of the location of the object, wherein the object represents a passive object, the tracking data represents image-based tracking data collected from a camera of the one or more tracking devices, the comparing comprises comparing the image-based tracking data to one or more image-based templates that include images of the passive object.

15. A device, comprising:

a user interface;

a processor;

a memory storing program instructions accessible by the processor, wherein, responsive to execution of the program instructions, the processor performs the following:

collect tracking data from one or more tracking devices independent of an object, the tracking data associate with the object;

compare the tracking data to one or more templates associated with a type of object to identify the object;

determine a location associated with the object based on the comparing; and output, from the user interface, a response indicative of the location of the object, wherein the tracking data represents gesture-based tracking data collected from a gesture monitoring circuit of the one or more tracking devices, the comparing comprising comparing the gesture-based tracking data to one or more gesture-based templates that include user movement patterns in connection with handling the object.

16. A computer program product comprising a non-signal computer readable storage medium comprising computer executable code to perform:

collecting tracking data from one or more tracking devices independent of the object, the tracking data associated with an object;

comparing the tracking data to one or more templates from a set of templates associated with different types of objects to identify the object;

determining a location associated with the object based on the comparing; and outputting, from an electronic device, a response indicative of the location of the object;

wherein the tracking data represents audio-based tracking data collected from a microphone of the one or more tracking devices, the comparing comprises comparing the audio-based tracking data to one or more audio-based templates that include audio signatures produced by the object.

17. The computer program product of claim 16, wherein the tracking data and one or more templates further comprise one or more of image-based, voice-based or gesture-based.

18. The computer program product of claim 17, further comprising a tracking log that includes an object identifier, a timestamp at which the tracking data was collected, a location associated with the tracking device that collected the tracking data, and a confidence level associated with the tracking data.

19. The computer program product of claim 17, wherein the tracking log maintains a running list of multiple entries associated with the object over time.

* * * * *